United States Patent [19]
Rach

[11] 3,974,896
[45] Aug. 17, 1976

[54] FAIL-SAFE BRAKE FOR A VEHICLE
[75] Inventor: David T. Rach, Milan, Ill.
[73] Assignee: J. I. Case Company, Racine, Wis.
[22] Filed: July 21, 1975
[21] Appl. No.: 597,421

[52] U.S. Cl. ............................ 188/170; 188/72.3; 188/366; 192/91 A
[51] Int. Cl.² ...................................... F16D 65/24
[58] Field of Search ............. 188/71.5, 72.3, 106 F, 188/106 P, 170, 366; 192/18 A, 91 R, 91 A

[56] References Cited
UNITED STATES PATENTS

| | | | |
|---|---|---|---|
| 3,145,816 | 8/1964 | Lorean et al. | 192/91 A |
| 3,188,922 | 6/1965 | Cruse | 188/170 |
| 3,547,233 | 12/1970 | Girvan | 188/170 |
| 3,647,030 | 3/1972 | Burnett | 188/72.3 |
| 3,831,718 | 8/1974 | Muller et al. | 188/170 |
| 3,842,949 | 10/1974 | Newstead | 188/72.3 |
| 3,893,549 | 7/1975 | Bennett | 188/170 |
| 3,895,695 | 7/1975 | Hunter | 188/170 |

FOREIGN PATENTS OR APPLICATIONS

| | | | |
|---|---|---|---|
| 1,943,792 | 3/1970 | Germany | 188/170 |
| 6,602,031 | 9/1966 | Netherlands | 188/170 |

Primary Examiner—Trygve M. Blix
Assistant Examiner—Edward R. Kazenske
Attorney, Agent, or Firm—Arthur J. Hansmann

[57] ABSTRACT

A fail-safe brake for a vehicle and including friction-type brake members and hydraulic pressure-type piston members operable on the brake members. Springs are also operable on the brake members for positioning and holding the brake members in braking relationship when the hydraulic pressure is absent. Also, hydraulic pressure can be utilized for overcoming the springs and releasing the brake members. The system includes hydraulic pumps and valves for controlling flow to and from the brake unit itself. A piston pilot member and a piston guide cylinder both guide the pistons.

10 Claims, 2 Drawing Figures

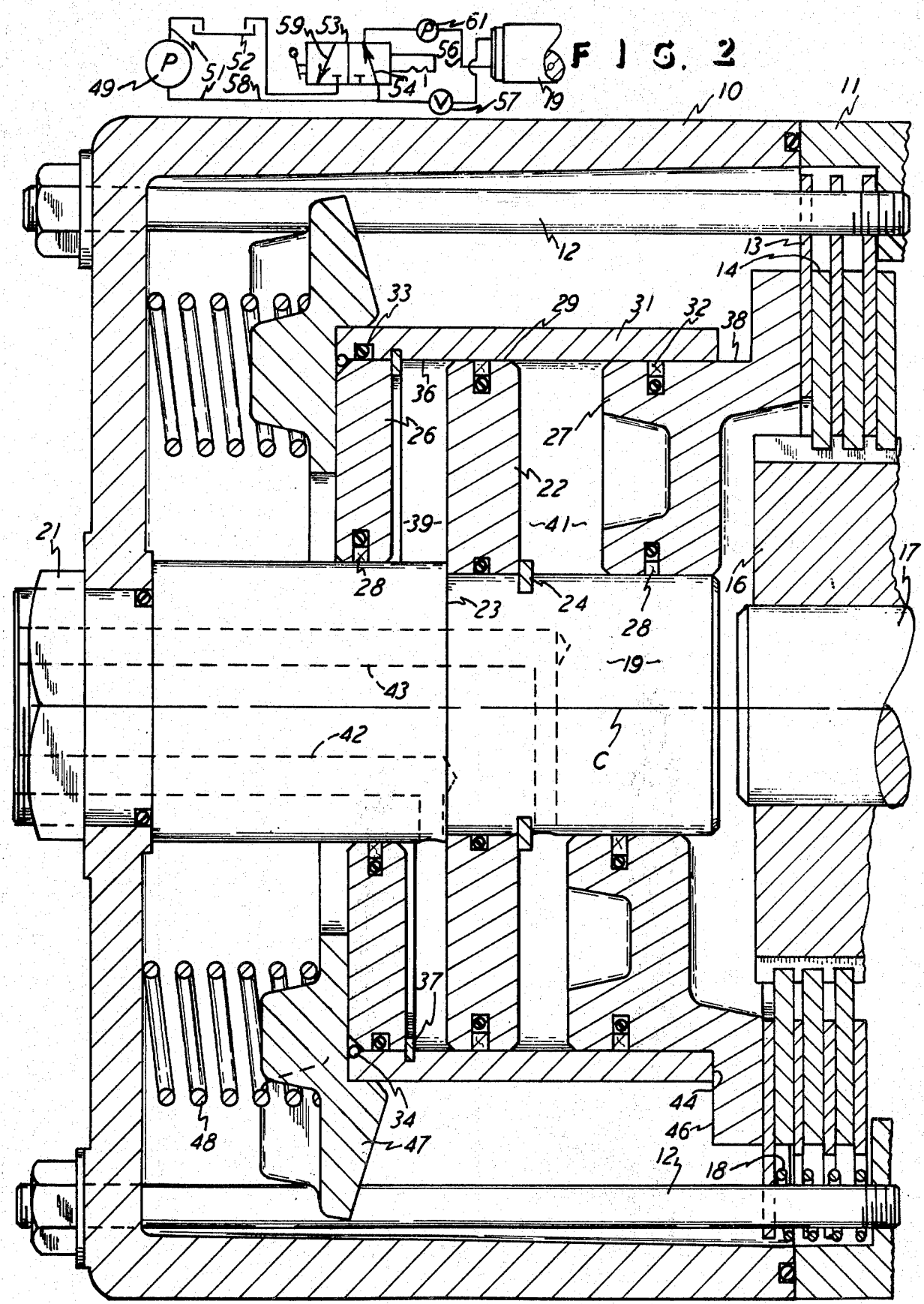

FAIL-SAFE BRAKE FOR A VEHICLE

This invention relates to a fail-safe brake for a vehicle, and, more particularly, it relates to a hydraulic type of vehicle brake and it has springs for positioning and securing the brake in an effective braking position in the absence of the hydraulic pressure, and it also has provision for an emergency brake action.

BACKGROUND OF THE INVENTION

The prior art is replete with structures and disclosures pertaining to hydraulic type brakes for vehicles. These prior art brake units are arranged with provisions for creating hydraulic pressure and applying it to brake members which are thereby displaced and held in a braking position in response to the hydraulic pressure applied thereto. Further, the prior art is aware of hydraulic-type brakes which also employ springs for actuating the brake members when the hydraulic pressure is not available, and two such isolated examples of the prior art are found in U.S. Pat. Nos. 3,613,839 and 3,647,030. Still further, U.S. Pat. No. 3,872,954 discloses an assembly which employs both hydraulic brake elements and principles, and it employs a spring for relieving pressure on clutch plates when there is no hydraulic fluid available for creating the pressure thereon. Also, U.S. Pat. No. 3,547,233 shows a brake assembly with a combination of hydraulic and spring means for controlling and actuating the brake unit, and the same is true for U.S. Pat. No. 3,770,085 and also U.S. Pat. No. 3,863,038 and also U.S. Pat. No. 3,557,913. The aforementioned patents show structures different from the one disclosed herein, and they also show structures which do not perform all the functions performed by the structure of the present invention, and they show structures of apparently lesser capacity than that of the present invention, and this appears to be true of the last-mentioned U.S. Patent.

Accordingly, it is an object of this invention to provide a fail-safe brake for a vehicle which is a general improvement on the structures heretofore known and, more particularly, it provides a unit which performs a greater number of functions and wherein the structure itself is of a greater capacity and more efficient in its operation.

In accomplishing the aforementioned objective, the structure of the present invention utilizes hydraulically-actuated pistons which are guided on a pilot member and which are also guided by a surrounding cylindrical member, with both of those members serving to contain and guide the movable pistons which can therefore have a large capacity for action and are reliable and sensitive in that they will not bind or cock in the structure. Further, the present invention provides the brake structure wherein the hydraulic fluid can be utilized for securing the brake in the engaged or vehicle park condition, and, also, hydraulic fluid can be manually pressurized and utilized for releasing the brake, even though the powered hydraulic pump or its attending brakeline and connections are not operating.

Other objects and advantages will become apparent upon reading the following description in light of the accompanying drawings.

BRIEF DESCRIPTION OF THE DRAWINGS

FIG. 1 is a longitudinal sectional view through a brake structure of this invention, and it shows the parts in two different positions above and below the centerline thereof.

FIG. 2 is a hydraulic schematic view of some of the elements of this invention.

DETAILED DESCRIPTION OF THE PREFERRED EMBODIMENT

The preferred embodiment shown herein includes a housing or casing 10 which encloses the unit or structure of this invention and another housing 11 is secured to the housing 10 by means of screws 12. Conventional disc type of brake members 13 and 14 are enclosed by the housing member 11 and are presented by a hub 16 on a shaft 17. Thus, in a conventional and a well-known arrangement, axial force on the members 13 and 14 will bring them into face-to-face contact with each other such that, if the members 13 are then precluded from rotating, the brake member 14 and consequently the shaft 17 will also cease rotating. Thus, in the usual way, the brake members 13 are engaged by at least some of the screws 12, as shown in the upper half of FIG. 1, and thus the brake members 13 and 14 are held against rotation when they are pressed together. Also, a compression spring 18, as shown in the bottom half of FIG. 1 and on screw 12, extends into contact with the plate 13 to relieve the axial pressure between the plates 13 and 14 when there is no braking force being applied thereto.

Therefore, the structure within the housing 11 may be substantially of a conventional arrangement, such as that shown in the aforementioned patents, and the remainder of the showing in FIG. 1 pertains to the structure of this invention.

A shaft 19 is mounted on the casing 10 and is secured thereto by a nut 21 and it carries a disc type of projection member 22 which is axially fixed with the shaft 19 by means of the shoulder 23 and the snap ring 24 on the shaft 19. Also, a first piston member 26 and a second piston member 27 are on the shaft 19 and extend radially therefrom and completely around the shaft 19. Thus the shaft 19 is a pilot member which mounts and guides the axially movable pistons 26 and 27 which also have fluid seals 28 extending between the piston members and the shaft 19.

The pistons 26 and 27 and the piston-shaped projection 22 all extend to the same radially outward circumference which is designated 29 on the projection 22. Thus, a cylindrical member 31 extends over the circumferences of the pistons 26 and 27 and the projection 22, and the member 13 is cylindrically shaped and of a length to extend well over the pistons 26 and 27 and it is fluid-tight with the two pistons and the projection 22, such as by means of the seals 32 and the O-ring 33. Also, the member 31 is affixed to the piston 26, to axially move therewith, and this is accomplished by means of a wire ring 34 which is engaged between the piston 26 and the inner circumference 36 of the member 31. Further, a snap ring 37 is operative between the piston 26 and the member 31, as shown.

The member 31 extends over the circumference 38 on the piston member 27, and thus the member 31 and the piston 38 are aligned with each other and are mutually guided by each other since the member 31 is in contact with the piston 26 and the projection 22. With that arrangement, the pistons 26 and 27 can have a substantial capacity in their hydraulic action described later, and the pistons 26 and 27 are also guided to remain aligned by means of the pilot member 19 and by the cylindrical member 31, to thereby avoid any sticking or cocking of the pistons 26 and 27.

The pistons 26 and 27 respectively define hydraulic pockets 39 and 41 with the member 22 and the cylindrical member 31. Also, the pilot member 19 has a hydraulic passageway 42 extending to the pocket 39 and it has a hydraulic passageway 43 extending in flow communication with the pocket 41. The passageways 42 and 43 extend externally of the shaft or pilot member 19 in the area of the nut 21, as shown, and FIG. 2 shows an arrangement for presenting hydraulic fluid under pressure at the passageways 42 and 43 and as hereinafter described.

With this arrangement, hydraulic fluid pressure in the passageway 43 will be transmitted to the pocket 41 and act upon the piston 27 to displace the piston to the right, as shown in the upper half of the drawing of FIG. 1, and this will press the disc brake members 13 and 14 together and thereby create the brake action. Relief of the hydraulic pressure in the pocket 41 will relieve the force on the disc 13 and 14 and it will permit the piston 27 to move to the left as shown in the bottom half of FIG. 1 and below the centerline marked C, and therefore the brake will be released if there is hydraulic pressure in the pocket 39 and acting on the piston 26 to displace the piston 26 to the left in FIG. 1 and thereby permit the piston 27 to move to the left, since it will be seen that the end 44 of the member 31 can abut the shoulder 46 of the piston 27 in the lower half of FIG. 1 and that is when the combined piston 26 and member 31 are moved to the right. However, the pressure in the pocket 39 will cause the piston 26 to move to the left, and this movement is against a ring member 47 which is in abutment with the piston 26 and which is urged to the right by the means of a plurality of compression springs 48 acting between the housing 10 and the member 47 to urge the piston 26 to the right. Therefore, whenever there is hydraulic fluid available in the pocket 39, then the pressure of the springs 48 is overcome by the leftward movement of the piston 26 under the influence of that hydraulic pressure, and that will prevent the springs 48 from causing the brake action.

Accordingly, up to this point, there is a service brake action achieved by hydraulic pressure in the pocket 41 to shift the piston 27 to the right and into braking action, and that braking action is released when the pressure in pocket 41 is released and there is pressure in the pocket 39. However, if there is no hydraulic pressure at all, then the springs 48 will shift the piston 26 and the carrier 31 to the right to cause the piston 27 to create force on the brake discs and thereby effect a braking action, and this is a fail-safe type of brake action which will occur even though there is no hydraulic pressure avaliable.

FIG. 2 shows a diagrammatic view of a hydraulic system wherein there is a hydraulic pump 49 having hydraulic lines 51 connected therewith and the lines extend to a hydraulic reservoir 52 and a hydraulic valve 53. Thus, having the valve 53 manually controlable and set in the position shown in FIG. 2, hydraulic pressure can go through the valve passageway 54 and into a hydraulic line 56 which is fluid-flow connected with the passageway 42 to thereby pressurize the pocket 39 and thus set the unit in position for operation of the service brake by presenting fluid pressure in the passageway 43 and the pocket 41. Thus, a hydraulic valve 57 is shown in a line 58 which extends to the passageway 43, and the operator can control the valve 57 which receives pressure from the pump 49 and passes the hydraulic pressure to the passageway 43 for the service brake operation.

When it is desired that the unit be retained in a mode with hydraulic pressure relieved in the pocket 39, then the valve 53 can be shifted to where the valve passageway 59 will permit the back flow or escape of fluid from the line 56, and that will permit the springs 48 to cause the braking action and thus the unit provides an emergency brake even though there is no hydraulic pressure available.

Still further, when it is desired to overcome the emergency brake action even when there is no hydraulic pressure available through the powered pump 49, the system contains a manually-operated hydraulic pump 61 which is in the line 56 and is therefore available for pressurizing the pocket 39 to thereby overcome the springs 48 and release the brake action.

With this arrangement, there is provided a multiplicity of actions including the service brake action through the pressurizing in pocket 41 and the fail-safe brake action through the springs 48 and there is also the emergency brake action by relieving the pressure in the pocket 39 and there is also the action of releasing the brake by manual means, such as the manually-operated pump 61.

What is claimed is:

1. A fail-safe brake for a vehicle having an actuator means and friction-type brake members operative to effect brake action in response to said actuator means applying a force thereon, said actuator means comprising a shaft pilot member, a projection coaxially on said pilot member, a piston member fluid-tightly slidable coaxially about said pilot member for movement toward and away from said projection, a cylindrical member affixed to said piston member and extending therefrom and in fluid-tight sliding relation over said projection and defining a fluid-retaining pocket with said projection and said piston member and being operatively associated with said brake members for forcing said brake members into braking action in response to movement of said piston member toward said projection, a fluid pressure pump and passageway in fluid-flow communication with said pocket for fluid pressurizing said piston member in the direction away from said projection to thereby relieve the braking force on said brake members, spring means operatively associated with said piston member for yieldingly moving said piston member toward said projection when the fluid pressure in said pocket is only a minimum pressure and to thereby effect a fail-safe brake action on said brake members, and an additional member being coaxially slidable on said pilot member and operatively associated with said brake members for effecting brake action in response to selective actuation of said additional member independent of movement of said piston member.

2. The fail-safe brake for a vehicle as claimed in claim 1, wherein said additional member is disposed between said piston member and said brake members and is in contact with said cylindrical member for transmitting force from said spring means to said brake members, and said additional member also being arranged for transmitting force directly to said brake members and independent of the force from said piston member, for a service braking action of the vehicle.

3. The fail-safe brake for a vehicle as claimed in claim 2, wherein said additional member is located to the side of said projection opposite from the location of said piston member and is spaced from said projection to define a fluid pocket with said projection, and an additional fluid passageway extending from said pump and into the latter said fluid pocket to have fluid force on said additional member to effect the service braking action.

4. The fail-safe brake for a vehicle as claimed in claim 1, wherein said additional member is a fluid-actuated piston, and including an additional fluid passageway extending from said pump and into flow communication with said fluid-actuated piston for transmitting force directly to said brake members and independent of the force from said piston member, for a service braking action of the vehicle.

5. The fail-safe brake for a vehicle as claimed in claim 4, wherein said cylindrical member on said piston member is movable therewith and extends over and in fluid-tight contact with said fluid-actuated piston, and said cylindrical member and said fluid-actuated piston having abutting surfaces for transmitting the force of said spring means to said fluid-actuated piston.

6. The fail-safe brake for a vehicle as claimed in claim 4, wherein said both fluid passageways extend in said pilot member, and wherein said cylindrical member on said piston member is movable therewith and extends over and in fluid-tight contact with said fluid-actuated piston, and said cylindrical member and said fluid-actuated piston having abutting surfaces for transmitting the force of said spring means to said fluid-actuated piston.

7. The fail-safe brake for a vehicle as claimed in claim 4, including a fluid-flow valve connected with the first-mentioned fluid passageway for controlling flow of fluid to and from said pocket and thereby selectively control the brake.

8. The fail-safe brake for a vehicle as claimed in claim 7, including an additional fluid-flow valve connected with said additional fluid passageway for controlling flow of fluid to said fluid-actuated piston and thereby selectively actuate the brake.

9. The fail-safe brake for a vehicle as claimed in claim 1, including a casing enclosing the brake members and the actuator means, , and connectors attached with some of said brake members and with said casing for effecting braking action against said casing.

10. The fail-safe brake for a vehicle as claimed in claim 1, including a manually maneuverable control operatively associated with said spring means for overcoming the force of said spring means and thereby manually release said brake.

* * * * *